Sept. 21, 1965  A. V. KISOVEC  3,207,457
CONVERTIPLANE

Filed Nov. 6, 1962  13 Sheets-Sheet 5

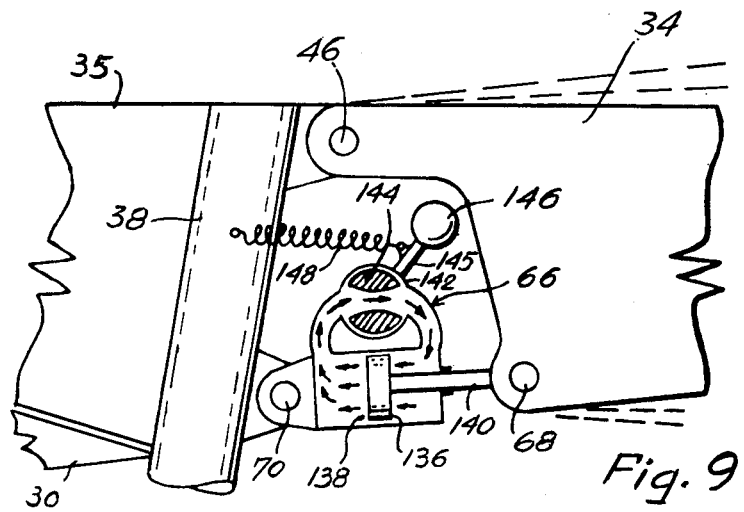
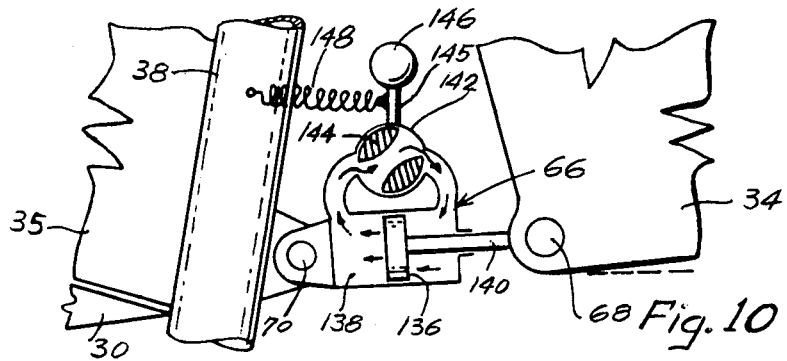
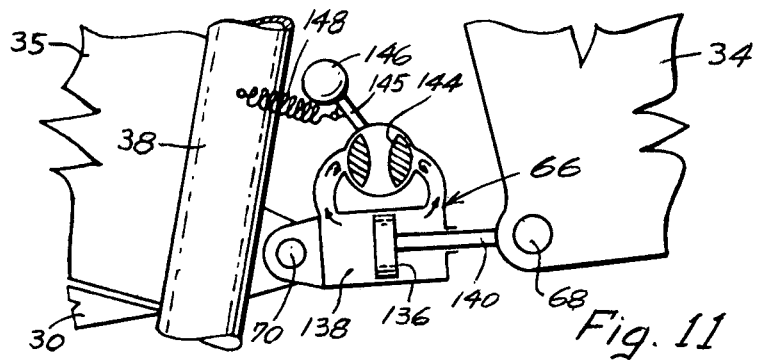

United States Patent Office 3,207,457
Patented Sept. 21, 1965

1

3,207,457
CONVERTIPLANE
Adrijan V. Kisovec, Montgomery County, Pa.
(45 Yale Square, Morton, Pa.)
Filed Nov. 6, 1962, Ser. No. 235,813
18 Claims. (Cl. 244—7)

This is a continuation-in-part of my patent application Serial No. 69,504, filed Nov. 15, 1960 and now abandoned.

The invention relates to a novel type of convertiplane. It provides a fixed winged aircraft with the advantages of a helicopter.

The primary object of the invention is to provide a compound type of aircraft, primarily designed for high speed flight in a fixed winged configuration but capable of helicopter type hovering flight and vertical or substantially vertical take-off and landing.

It is an object of the invention to provide in such an aircraft all the advantages of fixed winged flight and useful helicopter operation.

It is an object of the invention to design such an aircraft in which the control surfaces of the fixed winged configuration may be utilized in the helicopter configuration.

Likewise, it is an object of the invention to provide such an aircraft in which the control mechanisms operated by the pilot may be utilized for control of the aircraft in either configuration.

It is an object of the invention to provide means for rotating the outer portions of the wing panels for helicopter type flight utilizing the ailerons for helicopter pitch control or in one embodiment, the rotating wing panels themselves perform as ailerons in the fixed wing configuration.

It is an object of the invention to adapt portions of a conventional wing to helicopter type flight without impairing their efficiency for fixed winged flight.

A further object of the invention is to provide novel control means for suitably operating control surfaces on the outer wing portions in conventional fixed winged flight or in rotating helicopter flight.

It is an object of the invention to provide counter-balancing means for rotating wing portions which do not hinder or impair the fixed winged flight of the aircraft.

Still another object of the invention is to provide means for arresting the rotation of the helicopter portions for transition in flight to the fixed winged position.

Another object of the invention is to provide novel starting and retarding means as well as drive means for the rotating helicopter panels to reduce or eliminate torsional force at the main shaft and thereby reduce loads on the shaft.

It is an object of the invention to provide novel fuel feed means to the rotor drive of the helicopter members.

It is a further object of the invention to provide flapping freedom to the outer rotating wing panels when they are employed in the helicopter manner and to arrest such freedom when they are in the fixed winged configuration.

It is a further object of the invention to permit the use of the most desirable airfoil in the fixed winged configuration while permitting useful conversion to the helicopter configuration, that is, to provide such a convertiplane in which a useful helicopter configuration does not deter the selection or use of the most desired fixed wing airfoil to provide aerodynamically clean fixed wing aircraft.

It is an object of the invention to provide a VTOL aircraft having minimum fuel or engine thrust requirements for vertical flight.

It is a dual object of the invention to provide hovering and vertical flight means to an aircraft without detracting from its fixed wing performance, i.e., without employing any means producing additional drag in the fixed wing operation and to provide nonetheless efficient vertical lift means that do not create excessive power and fuel demands.

For example, the vertical thrust of propellers is inherently inefficient and requires excessive power and fuel consumption for hovering or vertical flight. Propellers so employed must then either be used for forward thrust thereby demanding design compromises with consequent inefficiencies or not employed at all in horizontal flight thereby constituting useless weight and, if not housed, additional drag as well. Thus, it is an object of my invention to rotate outer panels of fixed wings to provide economical helicopter lift and optional fixed wing utility by the same members when not so rotating.

Other objects and advantages of the invention will appear by reference to the following description of an embodiment employing my invention wherein:

FIGS. 9, 10 and 11 are details of the flap damping and arresting mechanism;

Figure 1:
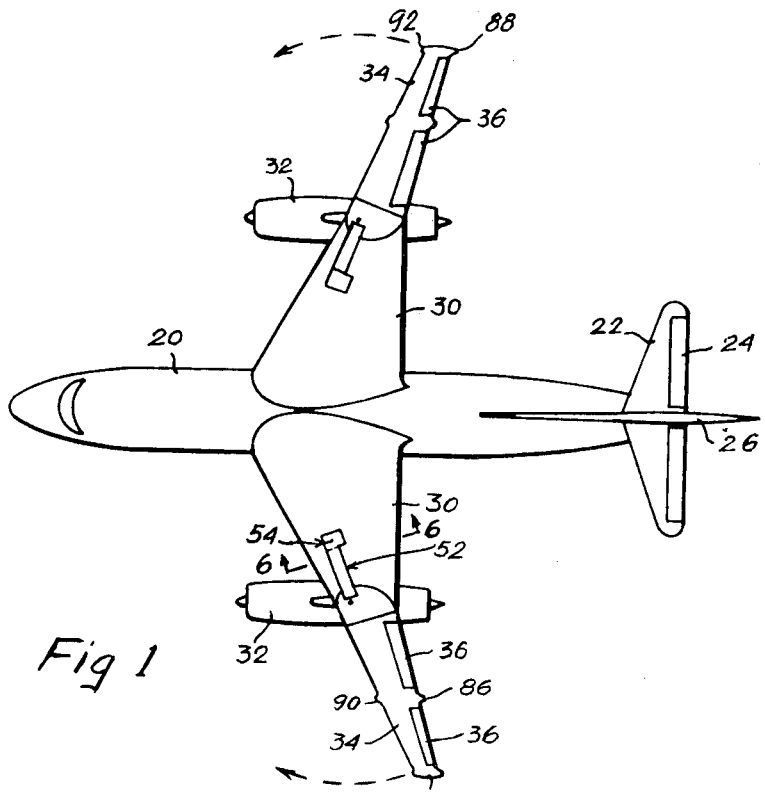
FIG. 1 is a plan view of an aircraft embodying the invention.
Figure 2:
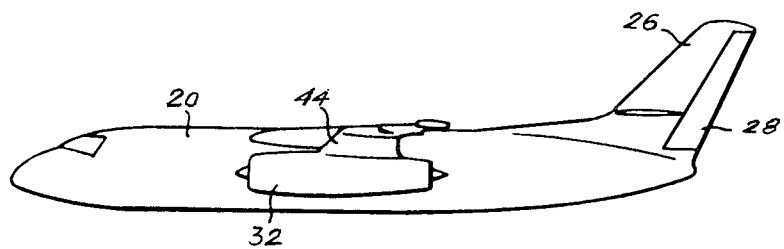
FIG. 2 is a side elevation of the same.

Referring to FIGS. 1 and 2, there is shown an aircraft having a fuselage 20, a horizontal stabilizer 22 with an elevator 24, a vertical stabilizer 26 and a rudder 28. The central fixed wing panel 30 may contain, as desired, one or more nacelles 32 for propulsion engines 33 which are conveniently shown here as of the jet type. Any type used or capable of use for propelling fixed wing aircraft may be employed.

Rotatably mounted at the outer ends of the fixed wing panels 30 are rotatable outer wing panels 34 provided with ailerons 36.

Only the structure of the right-hand wing is described in detail, but it will be readily apparent to anyone skilled in the art that the same structures in mirror image, that is bi-laterally symmetrical structures are provided for the left wing with the left wing panel rotating in the opposite hand as shown by the dash line arrows of FIG. 1.

Figure 3:
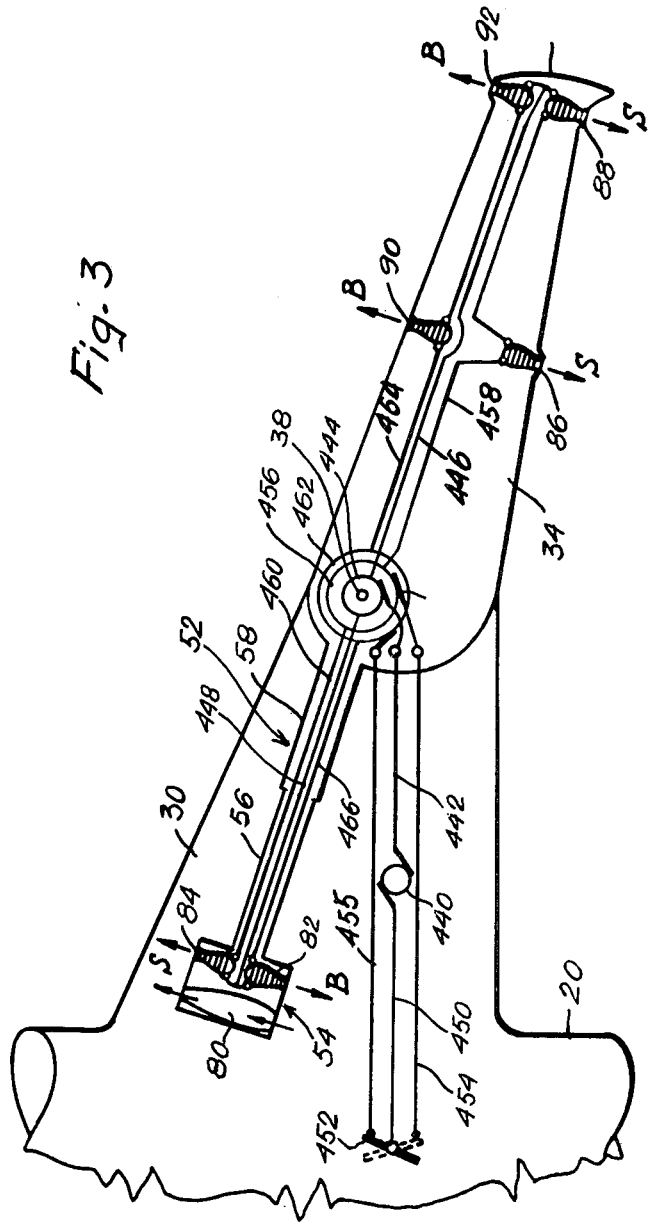
FIG. 3 is an enlarged schematic plan view of the right wing of the aircraft.
Figure 4:
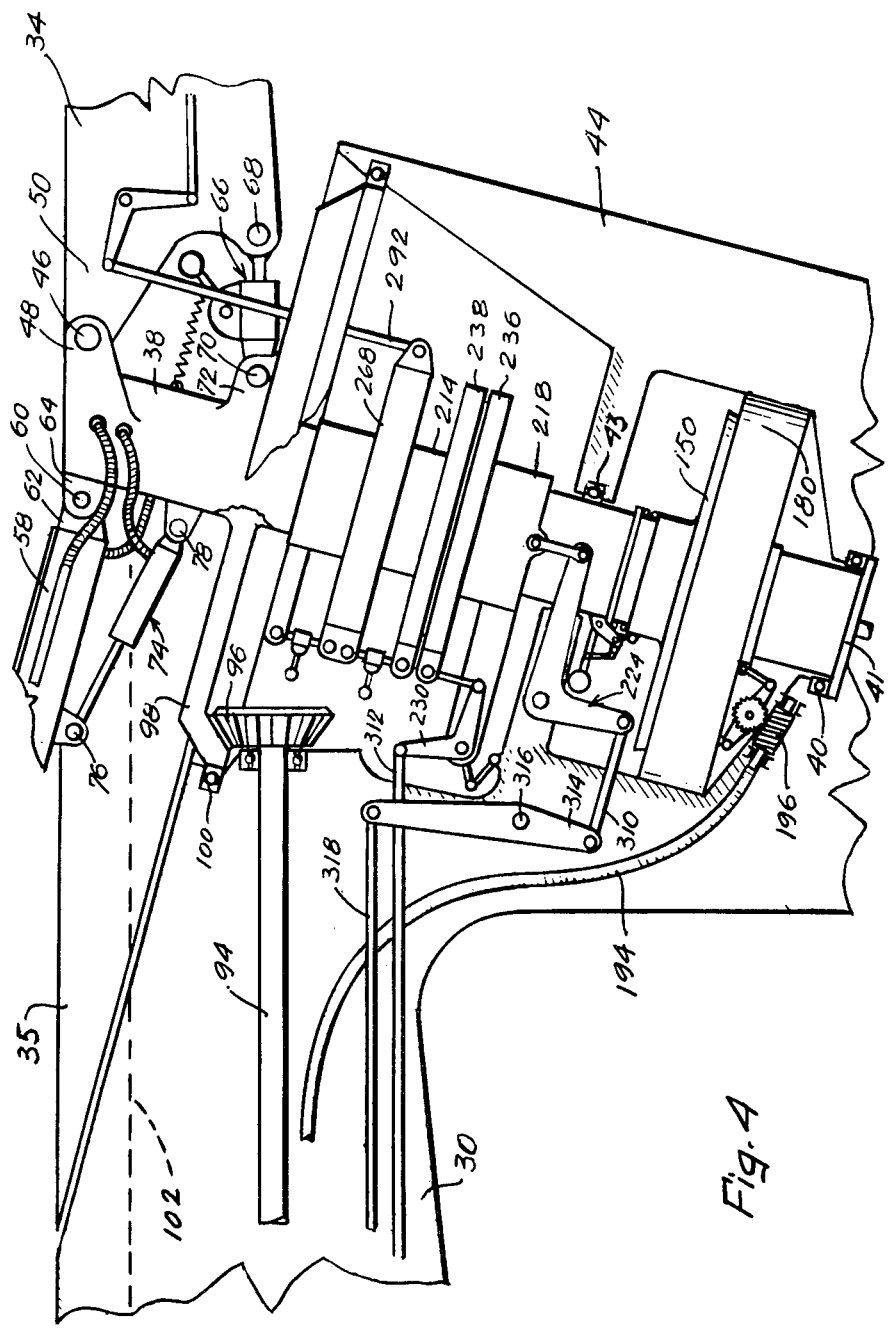
FIG. 4 is an elevation, partly in section, illustrating structural details of the rotor shaft assembly.
Figure 5:
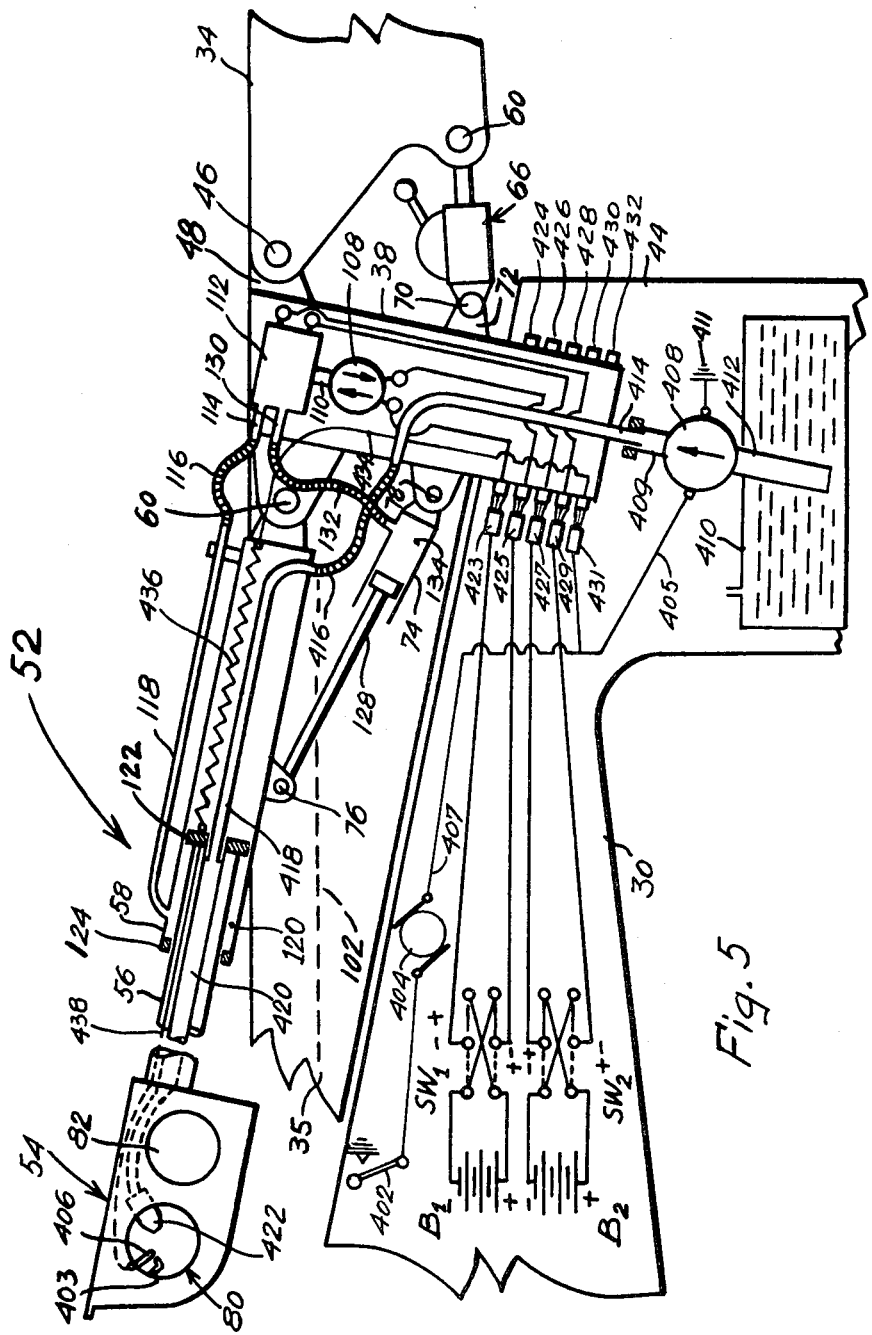
FIG. 5 is a schematic sectional elevation illustrating the fuel system for the helicopter drive means and the electrical and pneumatic controls for the rotary wing tip.
Figure 6:
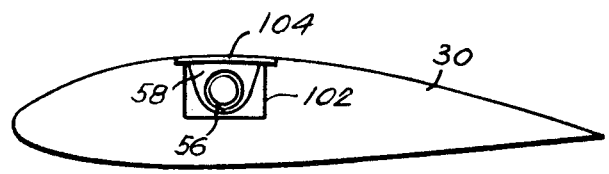
FIG. 6 is a sectional view taken on the line 6—6 of FIG. 1 (structural details of the wing cross section are omitted)

Referring to FIGS. 3, 4 and 5 (illustrating the right-hand wing) the outer rotatable wing panel 34 is secured to shaft 38 rotatably mounted in thrust bearings 40 and bearings 43 in the outer end of central wing panel 30 preferably, as shown, in the supporting stalk 44 of the engine nacelle 32. The thrust bearing 40 has one race secured to a plate 41 mounted on or integral with the bottom of shaft 38. The radial bearing 43 serves to take some of the radial forces originating from shaft flexion.

The outer wing panel 34 is pivotally secured to the shaft 38 by the pin 46 engaging the complementary lugs 48 and 50. The root section 35 of said outer wing panel is fixedly attached to the shaft 38 and it forms a smooth transition into the fixed center wing section 30 when said outer wing panel 34 is locked in the fixed wing configuration.

The wing panel is counterbalanced by the counterbalancing arm 52 carrying a counterbalancing weight 54. Arm 52 includes outer portion 56 slidably mounted to telescope into the inner arm 58 secured to rotatable shaft 38 by means of a pivot pin 60 horizontally hingedly connecting cooperating lugs 62 and 64. The outer panel 34 is selectively damped or stabilized by a damping and stabilizing mechanism 66 pivotally secured at its one end by a pivot pin 68 in the wing panel 34 and at its other end by a pivot pin 70 in a lug 72 secured to or integral with shaft 38.

In like fashion, balancing arm 52 is stabilized by a pneumatic actuator 74 pivotally secured at its one end by pin 76 to the arm 58 and at its other end by pin 78 to the rotatable shaft 38. Balancing weight 54 of the arm 52 contains a propulsion jet engine 80 as well as a pair of oppositely directed rocket engines 82, 84. The outer wing panel 34 is provided with a pair of initiating rocket engines 86, 88 and a pair of retarding rocket engines 90, 92. The arrows in FIG. 3 show the direction of flow of gases through the engines illustrated and are opposite to the direction of thrust. Jet engine 80, rocket engines 84, 86 and 88 are used to initiate counterclockwise rotation of wing panel 34 on the right-hand side of the aircraft. Rocket engines 82, 90 and 92 act to provide a clockwise moment to retard rotation of panel 34.

It will be understood in describing the right-hand wing panel 34 and its associated mechanism there is equivalent but oppositely rotating mechanism on the left of the aircraft. Both rotors are interconnected by a synchronizing shaft 94 having at each end a bevel gear 96 engaging a ring gear 98 secured to or integral with rotating shaft(s) 38. The ring gear and the shaft 38 are further stabilized and support by the radial bearing 100.

When the plane is in the fixed wing configuration, the stabilizing arm 52 is telescoped with the outer portion 56 nested in the inner portion 58 and is then retracted with the counterbalance weight 54 into the recess 102 extending in the central wing portion 30 and root section 35 of the outer wing panel 34. There may be conveniently provided the top fairing 104 to cover the recess 102 for the counterbalancing arm and weight.

Extension and retraction of the counterbalancing arm 52 is accomplished as follows.

Figure 7:
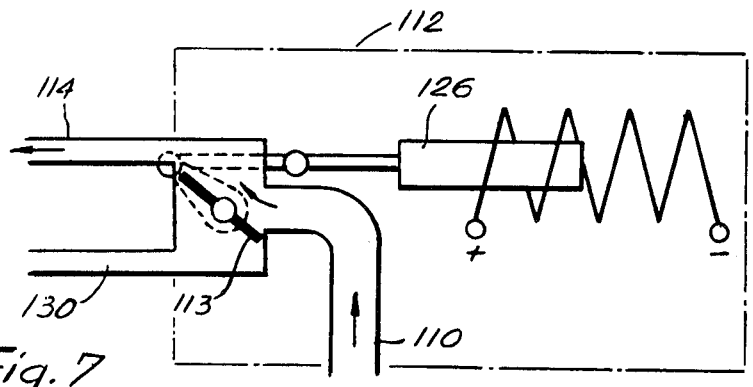
FIGS. 7 and 8 are details illustrating the control valve for elevating and extending the counterbalancing arm.
Figure 8:
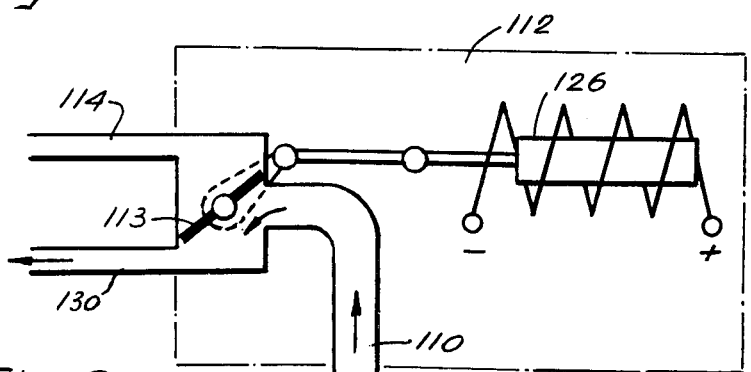

Referring to FIGS. 5, 7 and 8, a reversible electric air pump 108 is installed inside the rotor shaft 38 which feeds compressed air through a duct 110 to a solenoid-actuated valve 112. With the valve body 113 of the valve 112 in the position shown in FIG. 7, air passes through duct 114, a flexible hose 116 and a pipe 118 communicating with chamber 120 formed between the end seals 122 and 124 on arm portions 56 and 58 respectively. This compressed air moves arm 56 to the right or telescoped position. Reversal of electric pump 108 by a switch $SW_1$ across a battery $B_1$ creates a vacuum in the chamber 120 to extend arm 56 from arm 58.

The pneumatic actuator 74 operates in somewhat similar fashion but with the valve body 113 in the position shown in FIG. 8 by virtue of reversing the polarity of solenoid 126 through a switch $SW_2$ across battery $B_2$, that is shaft 128 is pneumatically extended by compressed air passing through duct 130 and flexible hose 132 communicating with chamber 134 of motor 74. Reversal of air pump 108 by switch $SW_1$ creates a vacuum in chamber 134 to retract arm 128 and with it balancing arm 52 and weight 44 into recess 102.

In the helicopter configuration, it is desirable to have the rotatable wing panel 34 in a free flapping position about the pivot pin 46 whereas in the fixed wing position it is desirable to lock or stabilize the wing panel position. Accordingly, the damping and locking mechanism 66 is provided with a shaft 140 secured to a piston 136 slidable in hydraulic chamber 138 filled with hydraulic fluid. The opposite ends of the chamber 138 communicate freely through a valve 142 having a valve body 144 which when it is in the position shown in FIG. 11 blocks such communication. The valve body 144 is actuated by a weight 146 on the end of valve arm 145 biased to the left as shown in FIGS. 9, 10 and 11 by the spring 148 secured at its other end to the rotor shaft 38. During rotation of the shaft in the helicopter configuration, the weight 146 is urged against the bias of spring 148 by centrifugal force to the position shown in FIG. 9 permitting free passage of hydraulic fluid between the ends of the chamber 138 and consequent free flapping of the outer wing panel 34 within the predetermined limits of travel of piston 136.

During transition to the fixed winged configuration, rotation of the outer winged portion is retarded by firing of rocket engines 82, 90 and 92. With a consequential diminution of the centrifugal force acting on the weight 146, the weight is brought to the position shown in FIG. 10 to initiate a suitable damping action on the rotating wing portion. The wing panel will then seek a position in which the lift force acting upon the outer wing 34 and the friction in the described hydraulic system are in balance. After the outer wing panel is finally stopped, the weight 146 moves into the position illustrated in FIG. 11 locking the piston 136 to stabilize the outer wing portion against further flapping.

Figure 12:
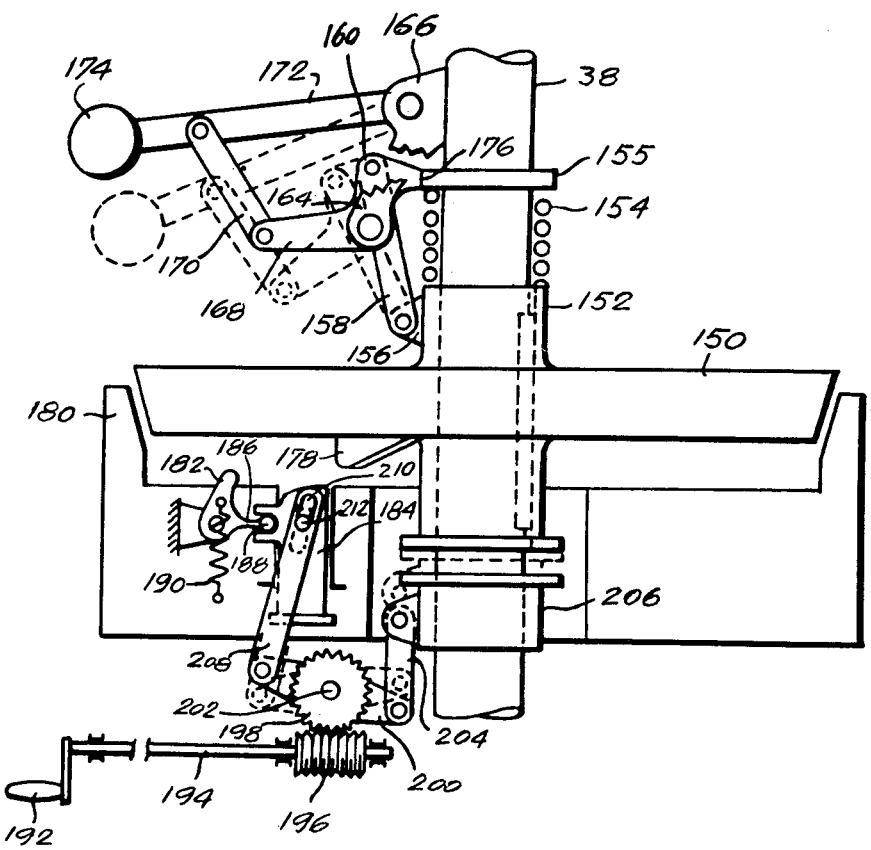
FIGS. 12 and 13 are detailed showings of the mechanical arresting and locking mechanisms for the rotating wing panels.
Figure 13:
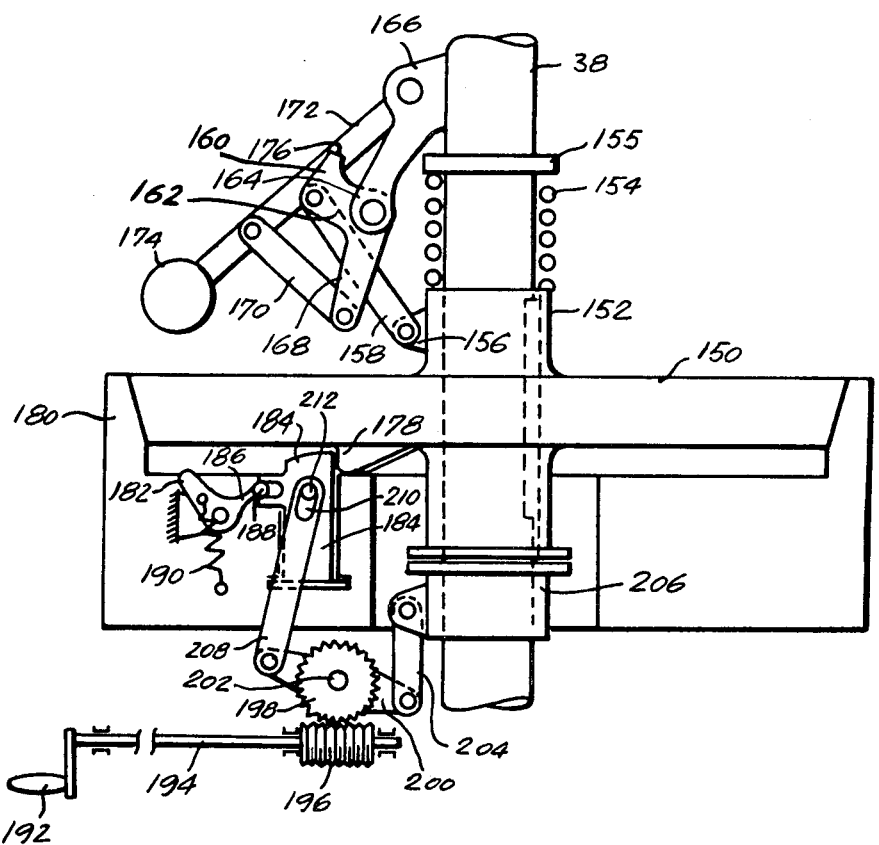

Since it is additionally necessary that the stationary position of wing panel 34 be in proper axial alignment with the fixed panel 30, the mechanical brake and stop means illustrated in FIGS. 4, 12 and 13 are provided. slidably, but nonrotatably, mounted to the rotor shaft 38 is a brake wheel 150 having an integral hub 152 on its upper face and biased downwardly by the compression spring 154 abutting against the face on an annular shoulder 155 on the shaft 38. Hub 152 has a lug 156 to which is pivotally attached a link 158 whose other end is pivoted to the arm 160 of a bell crank lever 162. The bell crank lever 162 is pivoted on an arm 164 of a lug 166 on rotor shaft 38. Pivotally mounted on the end of the other arm 168 of bell crank 162 is the link 170 whose other end is secured to arm 172 pivoted at its one end on the lug 166 and carrying at its outer end a weight 174.

Reference to FIGS. 12 and 13 shows that as the shaft 38 rotates the weight 174 is urged by centrifugal force upwardly and outwardly lifting brake wheel 150 against the bias of spring 154. This upward and outward motion is limited by an abutment 176 on arm 160 engaging the circumferential face of shoulder 155 whereby the described linkage 158 and 160 is in an "over-center" position preventing the brake wheel 150 from dropping during slight variation of rotor speed.

The brake wheel 150 is provided at its bottom side with a stop lug 178. When rotation of the shaft 38 is sufficiently reduced, the centrifugal force acting on weight 174 diminishes to the point that weight 174 brings the above described linkage back over center to the position shown in FIG. 13 whereupon the outer face of brake wheel 150 engages the stationary braking block 180 to frictionally further reduce rotary motion of the outer wing panel 34 and the rotary shaft 38.

In the lower position, as shown in FIG. 13, the stop 178 strikes the bell crank feeler 182 moving it from the position shown in FIG. 12 to the position shown in FIG. 13 so that the stop pin 184 is raised by arm 186 into the path of stop 178. The movement of the bell crank feeler 182 and stop pin 184 is augmented by an over center tension spring 190 anchored at one end in the braking block 180 ad at its other end in the bell crank lever 182 so that it moves past center to either of the two extreme positions of the feeler 182 illustrated in FIGS. 12 and 13 respectively. It should be understood that the feeler 182 and the pin 184 are positioned at the same radial distance from the axis of the rotor shaft 38, the feeler 182 being just subsequent in rotary direction to the pin 184. Thus the stop 178 and wheel 150 make almost a complete revolution after striking the feeler 182 before being arrested by pin 184.

When it is desired to convert the aircraft from the fixed wing configuration to the helicopter configuration, it is necessary to rotate a crank 192, shaft 194 and the worm 196 in the proper sense to rotate the gear 198 in a counterclockwise direction. The balanced lever 200 is secured to the shaft 202 of the gear 198 so that the slight rotation of the gear will raise the link 204 and the slidable sleeve 206 and with it the braking wheel 150. Continuing counterclockwise rotation likewise draws the link 208 downwardly so that the upper end of its slot 210 engages a stud 212 of a pin 184 pulling the pin 184 downwardly to the release position. These parts will then be in the position illustrated in dotted lines in FIG. 12 so that firing of the jet engine 80 and the rocket engines 84, 86, and 88 may begin rotation of the helicopter assembly including shaft 38. The weight 174 will then be raised to its upward and outward position maintaining brake member 150 in the upper position. Manual rotation of the crank 192 in the reverse sense will lower the sleeve 206 and raise the link 208 without disturbing the upward position of feeler 182 by virtue of the lost motion provided by the elongated slot 210. All parts will then be restored to the solid line position illustrated in FIG. 12.

The above description of FIGS. 1–13 inclusive illustrates an aircraft having fixed wings with a rotatable outer wing panel for helicopter flight. In the helicopter configuration, it is necessary to vary the angle of attack of the rotating wing panels both collectively and differentially as between the left and right wing panels in order to control ascent and descent and rolling about the longitudinal axis of the aircraft. Cyclical variation of the angle of attack of the panels must also be controlled for horizontal straight line propulsion as well as turning about the vertical and lateral axes.

The effective change of pitch or angle of attack of the rotating wing panels 34 is accomplished by the control of the aileron surfaces 36 in the helicopter configuration. The aileron surfaces 36 must also operate as conventional ailerons when in the fixed wing configuration. Accordingly, I have devised a unified system of control for accomplishing these several purposes in either configuration.

Referring to FIGS. 4, 14, 15 and 16, there is provided a sleeve or tubular shaft 214 splined on rotating shaft 48. Sleeve 214 is connected by a retaining ring 216 to a stationary housing 218. The ring 216 is secured to the sleeve 214 and is engaged in an internal annular groove in housing 218. Housing 218 is supported and vertically movable with respect to the shaft 38 by a pivoted link 220 secured at its other end to an arm 222 of a bell crank lever 224 pivoted in a stationary lug 226 attached to the fixed wing panel of the air frame. An arm 228 is secured to and extends from the housing 218 and has pivoted on its outer free end a bell crank lever 230 connected by a link 232 to a lug 234 on bottom plate 236 of swash or wobble plate 238.

The bottom plate 236 is pivoted on diametrically opposed stud shafts 240 (only one of which is shown). The bottom plate 236 supports the inner race 242 on which the upper swash plate 238 rotates. Upper swash plate 238 carries a lug 244 pivoted to piston rod 246 of hydraulic piston 248 in cylinder 250.

The opposed ends of the cylinder 250 communicate through ducts 252 and 254 connected through a centrifugally operated valve 256. Valve body 258 of valve 256 is actuated by an arm 260 having at its outer end a weight 262. During rotation of the shaft 38, centrifugal force acting on the weight 262 positions the valve 258 in the position illustrated in FIG. 14 thereby locking the fluid in cylinder 250 and preventing relative motion of the piston 248 in the cylinder 250. A lug 264 on top of cylinder 250 is pivotally attached to a lug 266 of a frame lever 268 pivoted on a pair of diametrically opposed stud shafts 270 (only one of which is shown). A piston rod 272 is pivotally attached at its free end to the lug 266 and its piston 274 is mounted in a cylinder 276 having its ends in communication through a valve 278 whose valve body 280 is actuated by an arm 282 having at its outer end a weight 284. During rotation of the shaft 38, the weight 284 and valve 278 as in the position illustrated in FIG. 14 and the piston 274 has a free lost motion movement in the cylinder 276. Lug 286, at the top of cylinder 276, is pivotally secured to an arm 288 secured to or integral with splined sleeve 214.

Frame lever 268 has a lug 290, opposite the lug 266, pivotally connected to a link 292 whose other end is pivotally attached to one end of a bell crank lever 294 pivotally secured on a lug 296 attached to the rotating panel 34. The other end of bell crank lever 294 is pivotally connected to a rod 298 in turn pivotally connected to one arm of a bell crank lever 300 (FIG. 16) whose other arm by means of a connecting rod 302 operates arm 304 of aileron 36.

Figure 14:
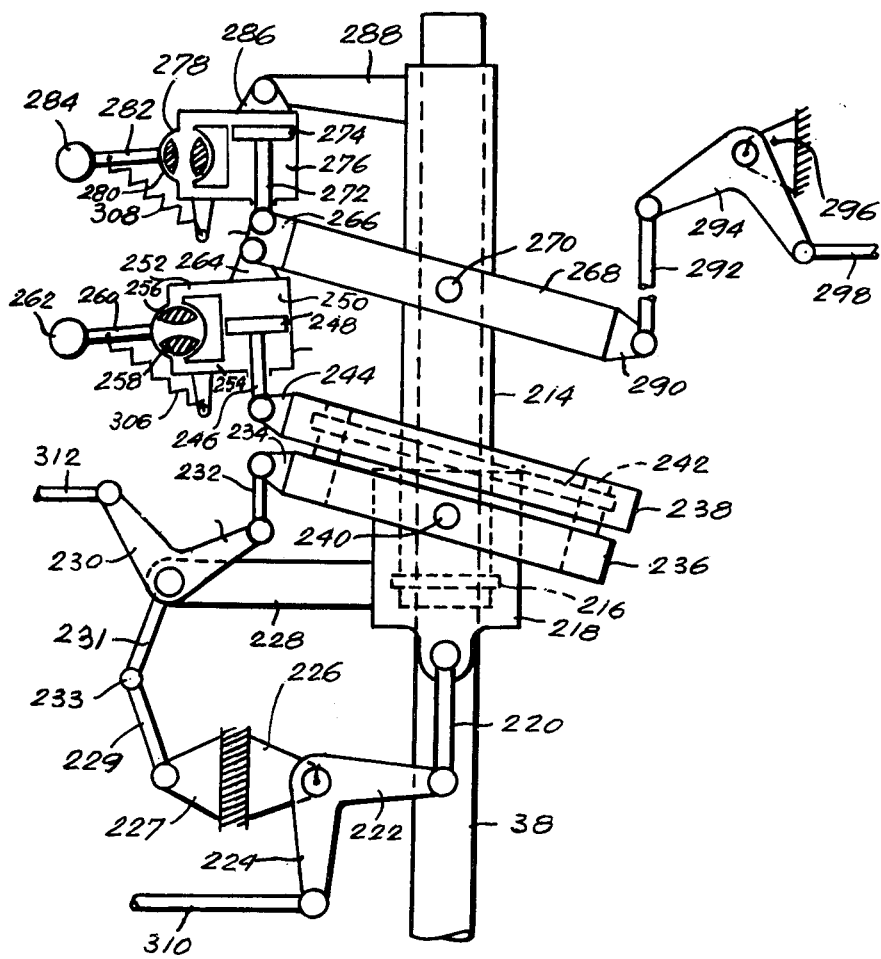
FIGS. 14 to 17 are detailed showings of the controls and control mechanisms for the control surfaces of the aircraft.

With reference to FIG. 14, it will be seen that the cant of wobble, or swash, plate 238 will cyclically operate the aileron 36 through locked piston and cylinder 248, 250, frame lever 268, bell crank lever 294 and the subsequent linkages. It will also be seen that movement of either or both the bell crank levers 224, 230 will vary the cant of swash plate 238 to change the cyclic pitch of aileron surface 36. Operation of the cockpit controls to move these bell crank levers will be hereinafter described.

In order to resist rotation of housing 218 due to friction between the housing 218 and sleeve 214 (and the swash plate friction), a stabilizing scissors 229, 233 and 231 is provided. Arm 229 is secured to a lug 227 on the fixed wing panel and is pivoted at 233 to arm 231 pivotally secured to arm 228 of housing 218. This permits free axial movement of housing 218 but resists rotative movement.

Figure 15:
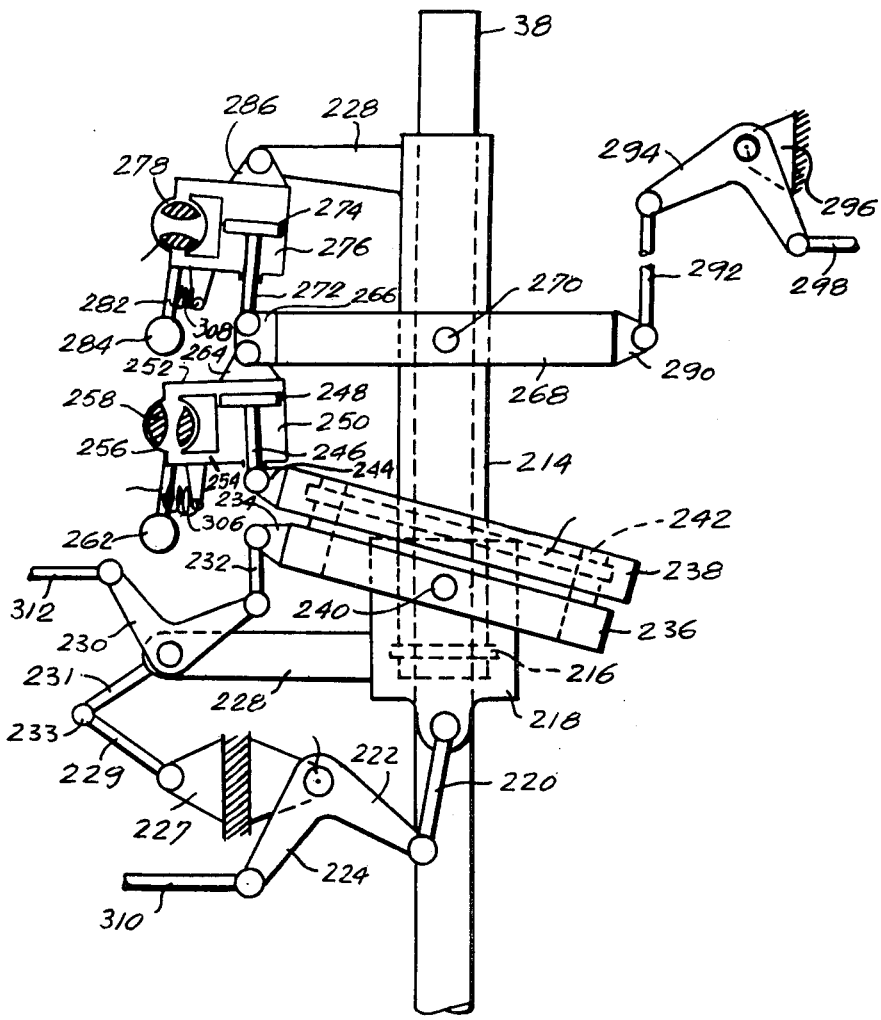

Referring to FIG. 15, the same parts are illustrated but with the shaft 38 stationary and accordingly the weights 262 and 284 in the position to which they are moved by springs 306 and 308 respectively. The valve body 258 is rotated to the open position and piston 248 moves freely in lost motion in the cylinder 250. Consequently, movement of the bell crank 230 acting on the swash plate 238 is ineffectual. Movement, however, of the bell crank 224 through link 220 raises and lowers the sleeve 214 and the stud shafts 270. The valve body 280 is in the closed position, and piston 274 and cylinder 276 are locked. Hence, the upward or downward movement of the sleeve 214 will act on the connecting link 292 to the bell crank 294 to raise or lower the aileron. There, thus is established a direct connection for aileron control in the fixed wing configuration.

As may be seen with reference to FIGS. 4, 14, 15 and 16, the bell crank lever 224 is controlled by rod 310 and the bell crank lever 230 by rod 312. The rod 310 is connected at its other end (FIG. 4) to a straight lever 314 pivoted in the nacelle stalk on pin 316. Lever 314 is connected at its other end to a push-pull rod 318.

Figure 17:
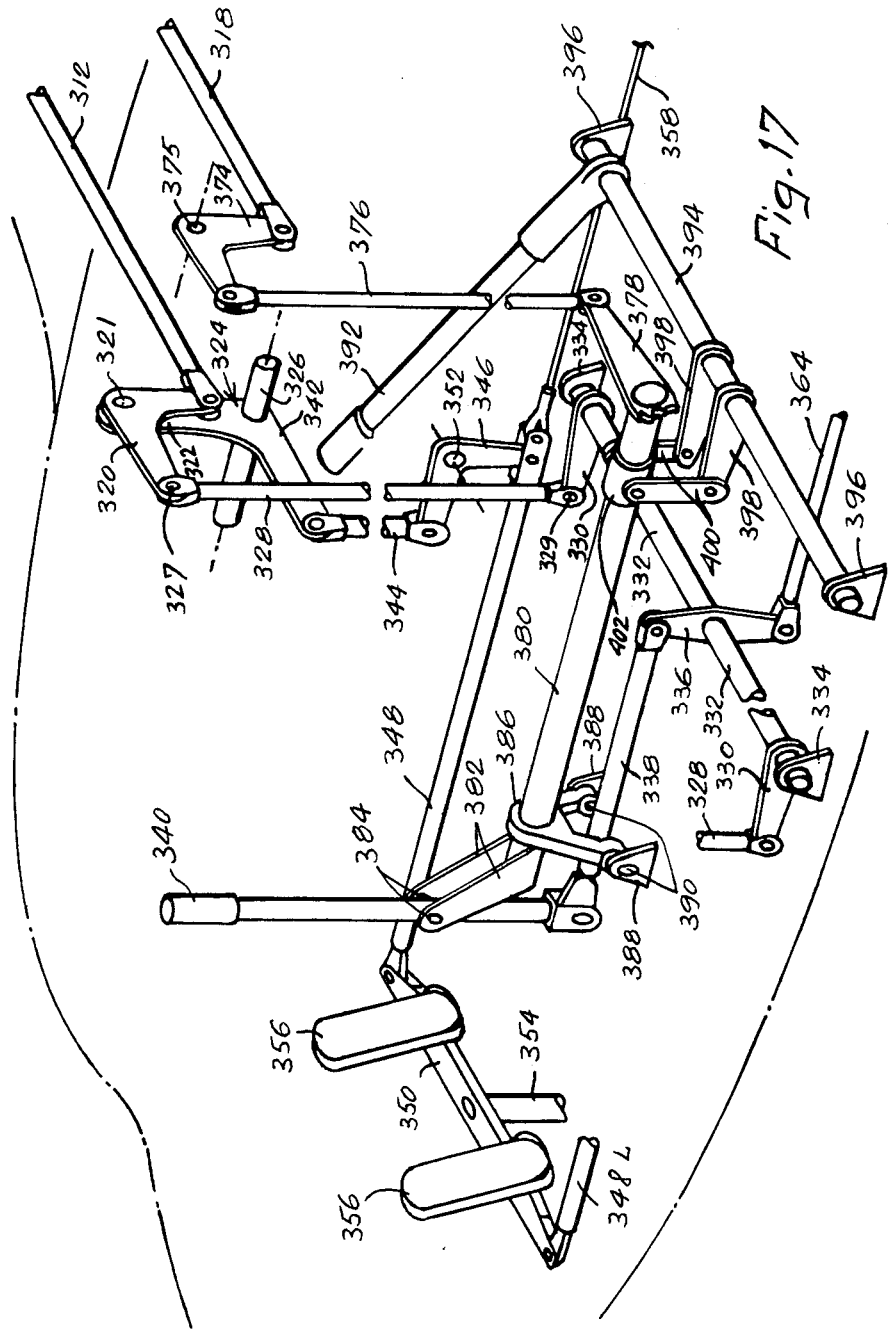

Referring now to FIG. 17 illustrating the cockpit controls, it will be seen that the rods 312 and 318 of the right-hand wing enter at the upper right-hand corner. The rod 312 which operates the bell crank lever 230 is pivotally connected at its inboard end to a bell crank lever 320 pivoted at the end of an arm 322 of a bell crank lever 324 mounted on a stationary pivot shaft 326 secured to the air frame in bearings (not shown).

The other arm of the bell crank lever 320 by spherical pivot 327 is connected to push-pull rod 328 whose other end is connected by spherical pivot 329 to the free end of an arm 330 secured to a rock shaft 332 journalled in the lugs 334 on the frame of the aircraft. The pivots 327 and 329 are of the spherical type which permits limited universal movement as well as pivotal motion.

The rock shaft 332 carries and is controlled by a double arm lever 336 which at its upper end is connected by link rod 338 to the bottom of control or joystick 340. These connections, as is evident, require spherical bearings. Rock shaft 332, of course, also carries the corresponding control arm 330 and rod 328 for the left wing of the aircraft.

Arm 342 of bell crank lever 324 is connected by spherical bearings to rod 344, bell crank lever 346, rod 348 to rudder bar 350. The bell crank lever 346 pivots about a pin 352 secured in the air frame by means not shown. Rudder bar 350 is pivoted on a stationary shaft 354 and has the foot pedals 356 for the pilot's feet.

Identical mechanism is provided in mirror image for the left wing of the aircraft starting with the part 348 L corresponding to part 348. The rods 348 have also pivotally connected to their rearward ends cables 358 to the tiller 360 operating the rudder 28. The double arm lever 336 has pivoted at its lower end the forward end of a push-pull rod 364 whose other end is pivotally attached to the arm 366 operating the elevators 24 about pivot 370 secured to the horizontal stabilizer 22 by means not shown.

The push-pull rod 318 is pivotally connected at its inward end to an arm of a bell crank lever 374 moving about a fixed pivot 375. The other end of the bell crank lever 374 is pivotally connected by the push-pull rod 376 to the outer end of a lateral lever 378 secured on the rock tube 380 rocked by the angled bracket 382 which pivotally supports the joystick 340 on the pivot pin 384. The rock tube 380 is journalled at its forward end in a bearing 386 pivoted in the stationary lugs 388 on the pins 390 permitting lowering and raising of the rearward end of rock tube 380.

The collective stick 392 is secured on a rock shaft 394 journalled in the stationary lugs 396 and carrying the arms 398 joined by the links 400 to a bearing collar 402 near the rearward end of the rock shaft 380. Raising and lowering the collective stick 392 will thus raise and lower the push-pull rods 376 simultaneously. This movement will also lower the pivot pins 384 to effect a small downward deflection of the elevator 24 through the linkages 338, 336, 364.

Referring now to FIG. 5, the fuel reservoir 410 in the stalk 44 of the engine nacelle receives a fuel line 412 entering a fuel pump 408 communicating at its pressure side with a duct 409 communicating with a rotating duct 414 in the center of shaft 38 leading to a flexible hose 416 communicating with a tube 418 slidably engaging a duct 420 in the arm portion 56 leading to a nozzle 422 in jet engine 80.

The rotating shaft 38 has electrical annular contact rings 424, 426, 428, 430 and 432. These annular rings are engaged by brushes 423, 425, 427, 429 and 431 respectively. The switch $SW_1$ across the battery $B_1$ is arranged to reverse the polarity across the brushes 423, 425, contacting the rings 424, 426, respectively, which are connected to the reversible air pump 108. Switch $SW_2$ across the battery $B_2$ in like fashion reverses the polarity across the brushes 427, 429 contacting the annular rings 428, 432 leading to the contacts of the solenoid 126. Switch 402 grounds a generator 404 connected through the lead 407 to the brush 431 contacting annular ring 432 connected by leads 434 and expandable lead 436 to a lead 438 on spark plug 406, which spark plug is grounded on engine 80 at 403. At the same time, the fuel pump 408 is energized by means of a lead 405 branching from the lead 407 and connecting said fuel pump with generator 404. Fuel pump 408 is grounded at 411.

With reference to FIG. 3, there is shown an electrical system for igniting the initiating and retarding rocket engines. A generator 440 has its common 442 connected to an annular ring 444 on shaft 38 having the leads 446, 448 to the commons of all the rocket engines. The other lead 450 from the generator 440 is selectively delivered through the switch 452 to either line 454 or 455. When the switch is in the dotted line position shown in FIG. 3, current is applied through line 454 to the annular ring 456. Lead 458 from ring 456 supplies current to the initiating rockets 88, 86, while the lead 460 also from the ring 456 delivers current to the initiating rocket engine 84. With the switch 452 in the solid line position, current is supplied through line 455 to the annular ring 462 which has one lead 464 to the retarding rocket engines 90, 92 and another lead 466 to the retarding rocket engine 82.

Figure 18:
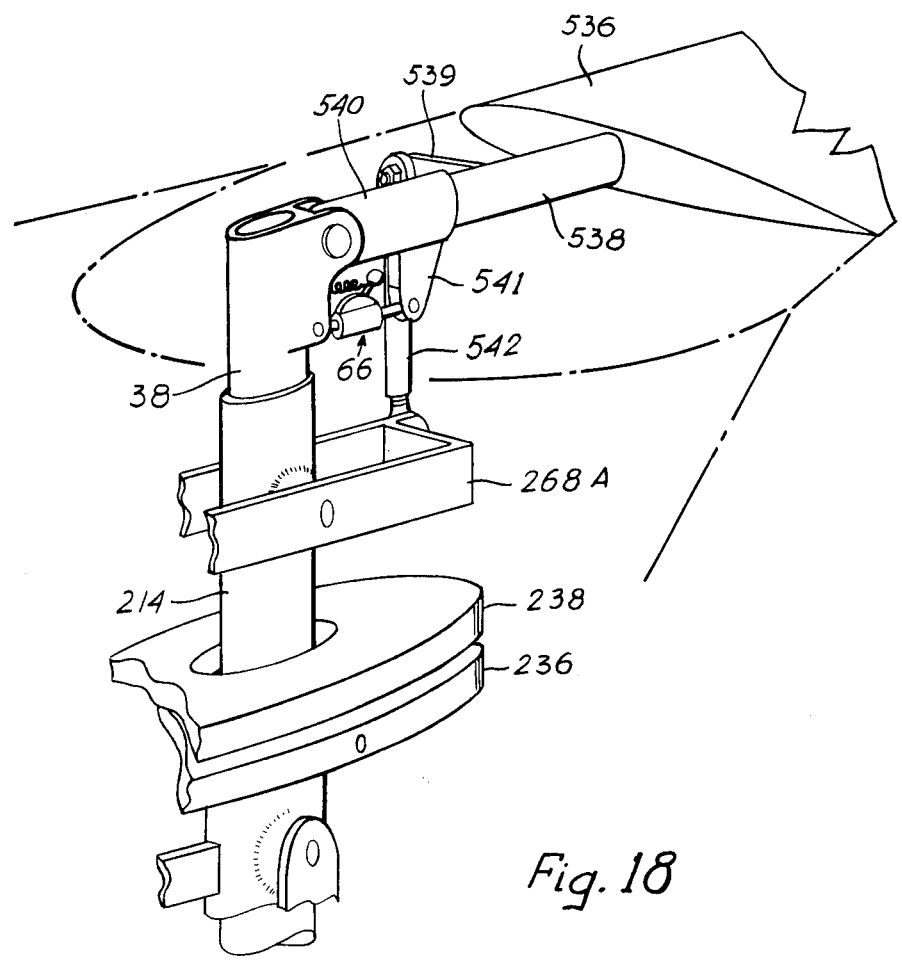
FIG. 18 illustrates another embodiment of the invention in which the entire outer wing panel pivots about the pitch axis.

FIG. 18 shows a modified embodiment in which the wing panel 536 is formed as a unitary section mounted on the shaft 38 by means of a pitch shaft secured in the wing panel 536 and rotatably but nonslidably held in the pitch bearing housing 540 pivotally mounted on shaft 38 for flapping motion. Between a lug 541 extending downward from said pitch bearing housing 540 and the shaft 38 the previously described damper body 66 is mounted pivotally on both ends. Damper 66 allows a free flapping motion of wing panel 536 in the helicopter configuration and locks wing panel 536 in the fixed wing configuration as previously described. The frame lever 268a is pivotally connected to the wing panel 536 by the adjustable link 542 pivoted at its one end to the lever 268a and at its other end to the pitch arm 539 on pitch shaft 538. It is operated in an analogous manner to the aileron 36 and serves in the fixed wing configuration as a combined wing panel and aileron and in the helicopter configuration as a rotating blade whose pitch is varied in the same manner by the same mechanism as heretofore described with respect to aileron 36. The parts having like numbers in FIG. 18 correspond to parts illustrated in the preferred embodiment.

FUNCTION AND OPERATION

Assume the aircraft to be in the fixed winged configuration and it is desired to convert it to, and operate it in, the helicopter configuration.

The air pump 108 (FIG. 5) is actuated through switch $SW_1$ to pump air through the valve 112 with the valve body 113 in the position shown in FIG. 8 by suitable activation of the switch $SW_2$. This actuates the motor 74 to raise arm 52 out of the recess 102. Reversal of the switches $SW_1$ and $SW_2$ then moves the valve body 113 to the position shown in FIG. 7 and reverses the air pump to draw air from the space 120 extending the telescoped portion 56 of the arm 52.

With reference to FIG. 13, the crank 192 is rotated so that the gear 198 and the lever 200 are operated counterclockwise raising the brake wheel 150 and lowering the stop 184. The parts will then be in the position shown in FIG. 12 with the lever 200 in the dotted line position. Initiating rocket and jet engines will then be started by actuating switch 452 to the dotted line position shown in FIG. 3. Upon rotation of the shaft 38, the crank 192 and associated parts are returned to the original position as shown in solid lines in FIG. 12. The slot 210 allows link 208 to slide relative to pin 212.

Ignition of the jet engine 80 is simultaneously or subsequently accomplished by closing the switch 402 which as above described activates both spark plug 406, 403 and fuel pump 408.

The wing panels 34 of each wing now rotate in their proper direction, that is the right-hand wing panel counterclockwise as viewed from above and the left-hand wing panel clockwise as viewed from above.

Helicopter control of the aircraft in this configuration is effected by compatible cockpit controls illustrated in FIG. 17. Raising the collective stick 392, for example, will raise the rearward end of rocking tube 380 and lower its forward end. This causes through the parts 338, 336 and 364 a slight downward deflection of the elevator. Primarily, however, the raising of the rearward end of tube 380 causes a downward deflection of both aileron surfaces to increase the lift of both rotating wing panels 34.

This deflection of the aileron surfaces is accomplished through tube 380 and the parallel raising of lateral lever 378 drawing push-pull members 318 inboard which through the linkages illustrated in FIGS. 4 and 14 raises the housing 218 which absent any substantial movement of the push-pull rod 312 raises the swash plate 238 and since the valve 256 is in the position shown in FIG. 14, the lifting motion is transmitted to frame lever 268 raising rod 292 in parallel motion thus rotating the bell crank lever 294 clockwise (FIG. 14) which causes a gross downward deflection of the aileron surfaces 36 irrespective and independent of the cyclical fluctuation effected by the cant of the swash plate 238.

Returning to the cockpit (FIG. 17), depression of the right-hand foot pedal 356 not only effects a right-hand movement of the rudder 362 but also through the bell crank lever 346 rotates the bell crank lever 342 clockwise as viewed in FIG. 17 moving the pivot 321 outwardly which, absent substantial axial movement of the shaft 328, which swings about the pivot 329, moves the push-pull rod 312 outwardly on the right-hand side. Conversely, the corresponding mirror image mechanism on the left side moves the left push-pull rod 312 (not shown) inwardly. This reduces forward propulsion of the right rotor (or if the aircraft is stationary or flying backward, increases the rearward propulsion). The reverse is true for the left wing. This produces a clockwise yaw. Obviously, depression of the left foot pedal will produce a counter-clockwise yaw.

Returning to FIG. 14, outboard movement of the push-pull rod 312 will decrease the cant of swash plate 238 on the right-hand side. It can be seen that the reverse action occurs on the left-hand push-pull rod 312 so that it is moved inboard increasing the cant of the swash plate 238.

Simultaneously the same action lowers piston 248 of the right wing and with it the lug 266 of frame lever 268 raising lug 290 to rotate bell crank lever 294 clockwise producing cyclic increase in the pitch angle of aileron 36 in the shown azimuth or outboard lateral position of the outer wing panel. Equivalent and reverse action on the left wing produces a cyclic angle decrease of aileron in the same azimuth. This produces a rearward tilt of the thrust vector on the right-hand rotating wing panel and causes a forward tilt of the thrust vector on the left-hand wing panel. This action causes the left wing to be propelled more than the right wing producing rotation of the aircraft about its vertical axis.

Movement of the joystick 340 to the right produces rotation of rock shaft 380 to the right lowering the right-hand end of lateral lever 378 moving the right-hand push-pull rod 318 outwardly, its push-pull rod 310 inwardly (see FIGS. 4, 14 and 17). This produces in the right wing a lowering of the housing 218. All other means being stabilized, the lowering of the housing 218 produces a considerable gross decrease in the overall deflection of the right-hand aileron 36 and conversely an overall increase in the deflection of the left wing aileron rolling the aircraft to the right about its longitudinal axis.

The rearward movement of the joystick 340 moves the push-pull shaft 338 forwardly rocking the rock shaft 332 forwardly and moving push-pull shaft 364 rearwardly to raise the elevator 24. The movement of the rock shaft 332 lowers both the left-hand and the right-hand arms 330 giving an outboard movement to both shafts 312 which, as seen by reference to FIG. 14, reduces the cyclical cant of the swash plate 238 and causes a downward aileron deflection when the outer wing panel is in the outboard lateral position and vice versa. This creates a rearward tilt of the rotor thrust vector reducing forward propulsion of the aircraft. The forward motion of joystick 340 reverses this motion and increases the cant of swash plate 238 causing a forward tilt of the rotor thrust vector and thus a forward helicopter propulsion.

While of reduced importance in the helicopter configuration, it will be observed that the operation of the empenage surfaces are in proper relation to the action of helicopter controls to provide compensating motions, for example, the raising of the elevator for hovering and the lowering of the elevator for forward propulsion. Further, a slight raising and lowering of the elevator results from movement of the collective stick by virtue of the shaft 380 moving through bearing 386 about the pivot points 390.

When it is desired to convert to fixed winged configuration, the main engines 32 are started or accelerated by conventional means, not shown. The engine 80 is stopped by opening the switch 402. Then the retarding rockets 82, 90 and 92 are fired by moving the switch 452 to the solid line position shown in FIG. 3. As the rotating wing tips slow down, they are automatically braked by the brake wheel 150 due to the lowered centrifugal force on the weight 174 (FIG. 12) until finally the lug 178 trips catch 182 raising the stop 184 to fix the wing tip panels 34 in their correct lateral position. The valve bodies 280 and 258 will then move to the positions shown in FIG. 15 and the aircraft controls will operate conventionally in the following manner.

Figure 16:
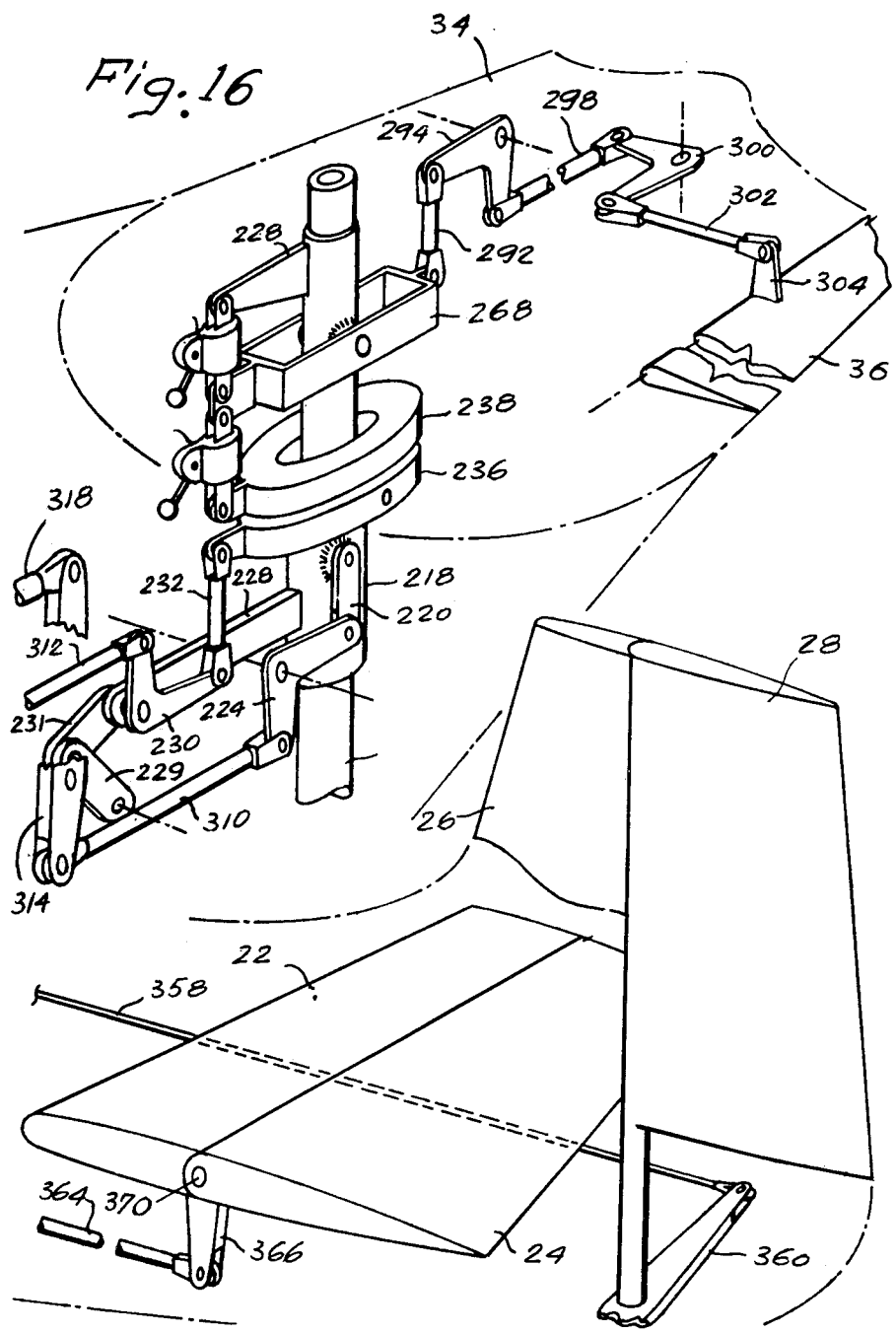

The rudder pedals 356 will actuate the rudder through the cable 358. The action of the rudder on the push-pull rod 312 becomes a lost motion action since the piston 248 moves freely in the cylinder 250 through the open position of the valve body 258. Motion of the swash plate about the stud shafts 240 becomes ineffectual. The elevator motion is accomplished through parts 338, 336, 332 and 364. The action of rock shaft 332 on push-pull rod 312 is again lost motion because of the position of the valve body 258. Aileron movement of the joystick, however, moves the push-pull rod 318 oppositely wing to wing. When the joystick, for example, is moved to the right, the push-pull rod in the right wing is moved outwardly and the push-pull rod in the left wing is moved inwardly. Outward movement of the push-pull rod 318 produces inward movement of the push-pull rod 310 through lever 314. Referring to FIG. 15, the inward movement of the push-pull rod 310 lowers the housing 218 and the spline sleeve 214. Such downward movement produces through the fixing of the piston 274 a downward movement of the link 292. This produces a counterclockwise movement of bell crank lever 294 and consequent raising of aileron 36 (FIG. 16).

The collective stick 392 is, of course, placed in a neutral position and is not utilized, during fixed wing operation of the aircraft.

It will thus be seen that the controls illustrated in FIG. 17 will effect the attitude of the aircraft in an equivalent manner whether the aircraft be in the helicopter or the fixed wing configuration. Moreover, a control transition is automatically effectuated by the centrifugally operated weights 262 and 284 as illustrated in FIGS. 14 and 15.

I claim:

1. An aircraft having a wing secured thereto, said wing comprising a pair of laterally extending portions, one secured at each side of the aircraft, said laterally extending portions being rotatably secured to said aircraft, selective means to secure said laterally extending portions against rotation to supply lift along substantially all of said laterally extending portions in fixed wing flight, mechanism connected to said laterally extending portions for cyclic and collective pitch control of said laterally extending portions and a drive device connected to said laterally extending portions to selectively rotate said laterally extending portions to supply substantially the sole means of vertical flight.

2. An aircraft having a fixed wing secured thereto at its center, said wing having a center portion and a pair of terminal outer portions, one at each end thereof, said portions being rotatably secured to said center portion, selective means to secure said outer portions against rotation to supply lift along substantially all of said outer portions in fixed wing flight, mechanism connected to said outer portions for cyclic and collective pitch control of said outer portions, and a drive device connected to said outer portions to selectively rotate said outer portions to supply substantially the sole means of vertical flight.

3. An aircraft having a wing substantially as set forth in claim 2 and further characterized in that its said outer portions include aileron surfaces connected to said mechanism.

4. A wing for use in a convertiplane comprising two sections, a first section having means at one end securable to an aircraft and having at its other end a substantially vertical rotatable shaft, a second or tip section pivotally secured to said shaft, selective timing and locking means linking said tip section to said shaft, means to rotate said tip portion and said shaft about the axis of said shaft, said selective timing and locking means permitting flapping motion of said tip portion during such rotation, and means to brake said shaft against rotation, said locking and timing means selectively preventing flapping of said wing tip portion when said shaft is braked to a stationary position, said wing sections being constructed and arranged to form a continuous sustaining airfoil when said tip portion is in axial alignment with said first section when said shaft is braked against rotation and said timing and locking means is in the selective locked position.

5. A convertiplane having a pair of oppositely positioned wings, each of said wings comprising a central or root section and a lateral or tip section, a vertical pivot operatively connecting said lateral tip section at its inward end to the outward end of said root section to permit rotative movement of said lateral tip section about the axis of said pivot, aileron surfaces operatively mounted in said tip section to each of said wings, push-pull control means operatively mounted in said tip section to raise and lower said aileron surfaces, an adjustable wobble plate mounted about said vertical pivot and operatively connected to said push-pull means, and control means to vary the position of said wobble plate during such rotation, said control means being selectively connected to said push-pull means for operation thereof when said tip panel is stationary and in alignment with said root section, whereby said ailerons in the fixed position provide coordinated aileron control and in the rotating position provide coordinated helicopter propulsion.

6. A wing for a convertiplane comprising an inward root section and an outer tip section, a tilted bearing connecting the inner end of said tip section to the outer end of said root section to permit rotation of said tip section about said bearing, a retractable counter-balancing arm connected to said bearing and positioned oppositely of said outer tip section, said outer tip section having a movable surface and unitary means for cyclically controlling the surface during rotation of said tip section to provide helicopter control and to selectively control said surface when said wing tip section in stationary to provide aileron control.

7. A device substantially as set forth in claim 6 and further characterized by a propulsion engine on the outer end of said counterbalancing arm for rotating the counterbalancing arm and said outer tip section.

8. A device substantially as set forth in claim 6 and further characterized by at least one propulsion engine mounted on said outer tip section.

9. A device substantially as set forth in claim 6 and further characterized by a recess formed in said root section to receive said counter balancing arm when said arm is retracted and said tip section is in a stationary position substantially aligned with said root section.

10. A device substantially as set forth in claim 7 and further characterized by an axial bore in said bearing and a communicating radial duct extending from said axial bore to said counter balancing arm, a source of fuel, means communicating said source of fuel to said axial bore in said shaft, and means to pump fuel from said source through said axial bore to said counter balancing arm and said propulsion engine.

11. For use in a convertiplane having a rotatable wing portion, a fixed wing portion, a member rotatably mounted in said fixed wing portion, pivot means securing said rotatable wing portion to said member for rotation therewith and permitting flapping motion of said rotatable wing portion about said pivot means, and damping means attached along said member from said pivot means, said damping means being further attached to said rotatable wing portion, said damping means including a mechanism to selectively lock said damping means to prevent flapping motion about said pivot means and release said damping means to permit flapping motion about said pivot means.

12. A device substantially as set forth in claim 11 and further characterized in that said damping means comprise a coacting piston and cylinder constructed to contain a fluid and said selective mechanism comprise a valve in communication with the ends of said cylinder, said valve being selectively movable to a closed position to terminate communication between the ends of said cylinder and selectively movable to an open position to permit free communication between the ends of said cylinder adapted for free passage of a fluid.

13. A device substantially as set forth in claim 12 and further characterized by a weight connected to said valve so that said valve is moved to its open position under the influence of centrifugal force acting on said weight during rotation of said member at a predetermined rotational speed.

14. In a convertiplane having a rotatable wing panel adaptable for fixed wing flight and rotary wing flight, actuating means to vary the pitch angle of said panel, said panel being secured to a rotatable shaft, a member slidable along said shaft, a swash plate adjustably mounted on said member, disengagable coupling means interconnecting said swash plate and said actuating means to cyclically operate said actuating means from said swash plate during rotation of the shaft and further disengageable coupling means interconnecting said slidable member and said actuating means to operate said actuating means therefrom whereby said actuating means may be selectively operated from said swash plate and from said slidable member upon selective engagement of one of said disengageable coupling means.

15. A device substantially as set forth in claim 14 and further characterized in that centrifugally operated mechanisms are provided to disengage each of said disengageable coupling means, the first of said disengageable coupling means being engaged by centrifugal force produced by a predetermined minimum rotary speed of said shaft and the second of said disengageable coupling means being engaged in a range of zero centrifugal force to less than the centrifugal force produced by said predetermined minimum rotary speed.

16. A device substantially as set forth in claim 14 and further characterized in that said swash plate has a pivot mount on said slidable member, means engaging said swash plate to vary its cant by movement about said pivot mount, a joystick, a rudder bar, means interconnecting said last named means to said joystick and said rudder bar and activating means for sliding said slidable member, said activating means operatively connected to said joystick and said slidable member.

17. In a convertiplane having left-hand and right-hand rotatable wing panels suitable for fixed wing flight and rotary wing flight, means mounting each of said panels for rotation about an axis, each of said panels having actuating means connected thereto to vary their pitch angle, a swash plate for each of said panels having mounting means positioning it about the axis of rotation of said panel, said mounting means including slide means supporting said swash plate, canting means engaging said swash plate and movable to vary the cant thereof, disengageable coupling means interconnecting said slide means with said actuating means and further disengageable coupling means interconnecting said swash plate and said actuating means, control means connected to said canting means and said slide means.

18. Mechanism substantially as set forth in claim 17 and further characterized in that said control means comprise rudder controls operatively and oppositely connected to said canting means of each panel and suitable for actuating a rudder and aileron control means operatively and oppositely connected to said slide of each panel.

References Cited by the Examiner

UNITED STATES PATENTS

| | | | |
|---|---|---|---|
| 2,411,297 | 11/46 | Serna | 244—7 |
| 2,498,283 | 2/50 | Lee | 170—159.1 X |
| 2,523,216 | 9/50 | Isacco | 170—135.75 |
| 2,544,497 | 3/51 | Herrick | 244—7 |
| 2,742,095 | 4/56 | Pitcairn et al. | 170—159.1 |
| 2,826,255 | 3/58 | Peterson | 170—135.75 |
| 2,827,135 | 3/58 | Sorchy | 188—187 X |
| 2,827,136 | 3/58 | Sorchy | 188—187 X |
| 3,025,022 | 3/62 | Girard | 244—7.1 X |

FOREIGN PATENTS

| | | |
|---|---|---|
| 418,121 | 10/34 | Great Britain. |

FERGUS S. MIDDLETON, *Primary Examiner.*